(12) United States Patent
Lin

(10) Patent No.: US 6,816,770 B1
(45) Date of Patent: Nov. 9, 2004

(54) DIRECTION AND SPEED CONTROL DEVICE FOR A MOTOR VEHICLE

(75) Inventor: Samuel Lin, Chia Yi Hsien (TW)

(73) Assignee: Sunpex Technology Co., Ltd., Chia Yi (TW)

( * ) Notice: Subject to any disclaimer, the term of this patent is extended or adjusted under 35 U.S.C. 154(b) by 0 days.

(21) Appl. No.: 10/810,515

(22) Filed: Mar. 26, 2004

(51) Int. Cl.$^7$ ................................ B62D 61/02
(52) U.S. Cl. ................ 701/93; 701/36; 180/65.1; 180/65.8
(58) Field of Search .................. 701/1, 36, 41, 701/93; 180/65.1, 65.5, 65.6, 65.8, 220, 230

(56) References Cited

U.S. PATENT DOCUMENTS

| | | | | |
|---|---|---|---|---|
| 5,222,572 A | * | 6/1993 | Yamagiwa et al. | ......... 180/220 |
| 5,406,154 A | * | 4/1995 | Kawaguchi et al. | ...... 310/67 R |
| 5,552,988 A | * | 9/1996 | Kawaguchi et al. | .......... 701/70 |

* cited by examiner

Primary Examiner—Richard M. Camby
(74) Attorney, Agent, or Firm—Brian T. Sattizahn; McNees Wallace & Nurick LLC

(57) ABSTRACT

A direction and speed control device includes a casing, a sensing unit, and a magnet assembly. The sensing unit includes a magnetic sensor. The magnet assembly includes a pivot axle that is mounted rotatably on the casing and that has a magnet carrying portion extending into the casing, and a driven portion extending from the magnet carrying portion and disposed outwardly of the casing, and further includes first and second magnets mounted on the magnet carrying portion and disposed on opposite sides of the magnetic sensor. The driven portion is operable to rotate the pivot axle relative to the casing so as to displace the first and second magnets relative to the magnetic sensor. The sensing unit generates a control output for controlling direction and speed of a motor vehicle in accordance with the displacement of the first and second magnets relative to the magnetic sensor.

7 Claims, 8 Drawing Sheets

DIRECTION AND SPEED CONTROL DEVICE FOR A MOTOR VEHICLE

BACKGROUND OF THE INVENTION

1. Field of the Invention

The invention relates to a control device for a motor vehicle, more particularly to a control device that employs a magnetic sensor to control direction and speed of a motor vehicle.

2. Description of the Related Art

An electric motor vehicle usually has a control device mounted proximate to a handle thereof for controlling its moving direction and speed. As shown in FIGS. 1 and 2, the control device 2 is mounted on a rear side of the handle 11 of the motor vehicle, and is coupled to a control rod 12.

The known control device 2, which has an operating principle based on that of a potentiometer, includes a case body 21 fixed to the handle 11 via an L-shaped bracket 111, a circuit board 22 mounted horizontally in the case body 21 and formed with a pair of arc-shaped resistive traces 221, and a slider assembly formed from a pivot axle 23 that is mounted rotatably on the case body 21, a contact carrier 24 that is disposed in the case body 21 and that is coupled co-rotatably to the pivot axle 23, and a pair of contact members 25 that are mounted on the contact carrier 24 for sliding along the resistive traces 221. A torsion spring 26 biases the pivot axle 23 to an initial position. A cover 27 is provided to close a top open side of the case body 21.

One end of the pivot axle 23 extends downwardly through the case body 21, and is coupled to the control rod 12. As such, the control rod 12 is operable to rotate the pivot axle 23 by a desired angle in a selected one of advancing and reversing directions.

When no external force is exerted on the pivot axle 23, the pivot axle 23 is disposed at the initial position due to the biasing action of the torsion spring 26. The contact members 25 are disposed at middle portions of the resistive traces 221 at this time.

Thereafter, when it is desired to move the motor vehicle in one of an advancing direction and a reversing direction, the control rod 12 is operated to rotate the pivot axle 23 in a corresponding one of a clockwise direction and a counterclockwise direction. As a result, the contact members 25 are displaced along the resistive traces 221. Since the operating principle of the control device 2 is based on that of a potentiometer, displacement of the contact members 25 along the resistive traces 221 will result in a control output having a voltage magnitude corresponding to movement of the control device 2 in the desired direction. That is, the larger the angle of rotation of the pivot axle 23, the faster will be the moving speed of the motor vehicle in the desired direction.

While the aforementioned conventional control device 2 can achieve its intended purpose, the following drawbacks are encountered during use:

1. The resistive traces 221 are likely to wear out due to friction contact with the contact members 25. As such, the service life of the control device 2 is relatively short.
2. The legs of the torsion spring 26 are likely to break due to stress after a period of use, thereby resulting in the inability to restore the pivot axle to the initial position. Hence, an unintended control output for driving movement of the motor vehicle is likely to be generated, which is hazardous.

SUMMARY OF THE INVENTION

Therefore, the object of the present invention is to provide a direction and speed control device that can overcome the aforesaid drawbacks associated with the prior art.

Accordingly, the present invention provides a direction and speed control device that comprises a casing, a sensing unit, and a magnet assembly. The casing is adapted to be mounted fixedly on a motor vehicle. The sensing unit is mounted in the casing, and includes a magnetic sensor. The magnet assembly includes a pivot axle, and first and second magnets. The pivot axle is mounted rotatably on the casing, and has a magnet carrying portion extending into the casing, and a driven portion extending from the magnet carrying portion and disposed outwardly of the casing. The first and second magnets are mounted on the magnet carrying portion of the pivot axle, and are disposed on opposite sides of the magnetic sensor. The driven portion of the pivot axle is operable externally of the casing for driving rotation of the pivot axle relative to the casing so as to move one of the first and second magnets toward the magnetic sensor and so as to move the other one of the first and second magnets away from the magnetic sensor. The sensing unit is adapted to generate a control output for controlling movement of the motor vehicle in one of an advancing direction and a reversing direction and for controlling moving speed of the motor vehicle in said one of the advancing and reversing directions in accordance with displacement of the first and second magnets relative to the magnetic sensor.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
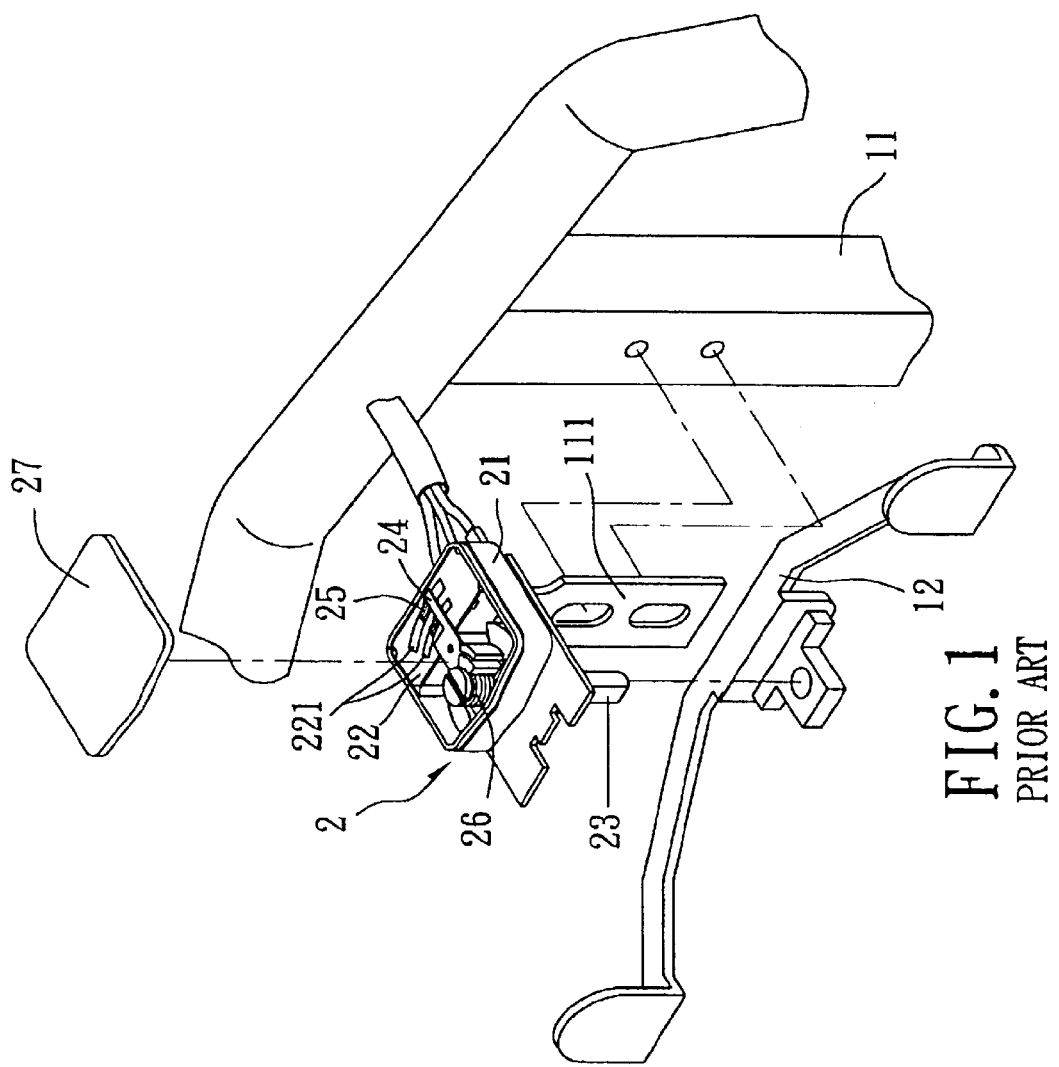
FIG. 1 is a partly exploded perspective view of a conventional control device for controlling direction and speed of a motor vehicle.
Figure 2:
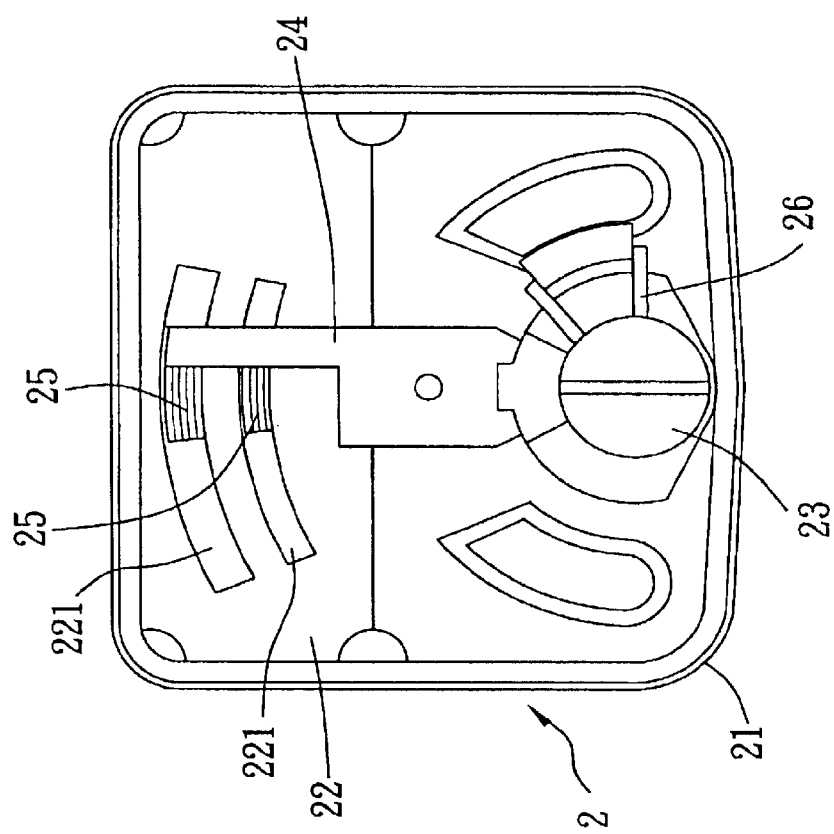
FIG. 2 is a top view of the conventional control device of FIG. 1.
Figure 3:
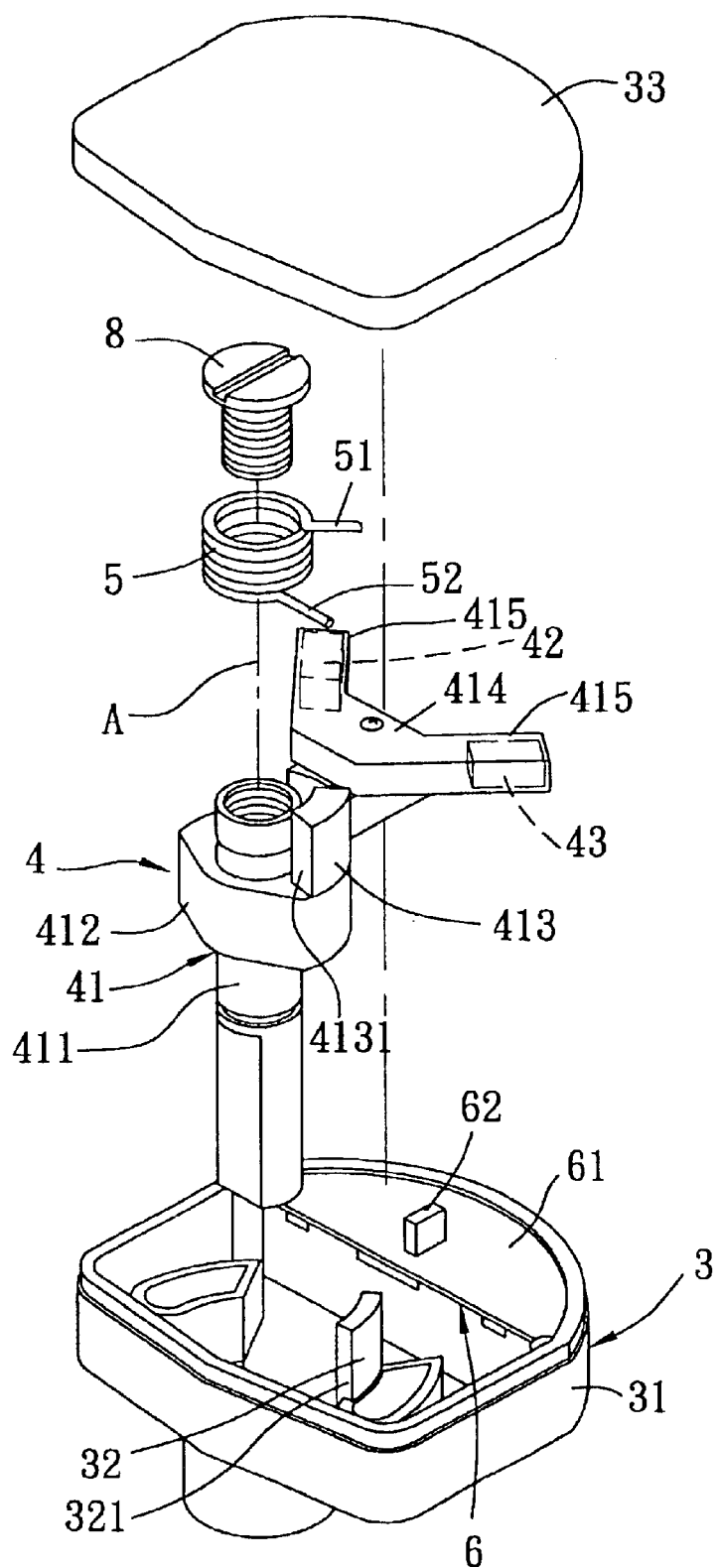
FIG. 3 is a partly exploded perspective view of the preferred embodiment of a direction and speed control device for a motor vehicle according to the present invention.
Figure 4:
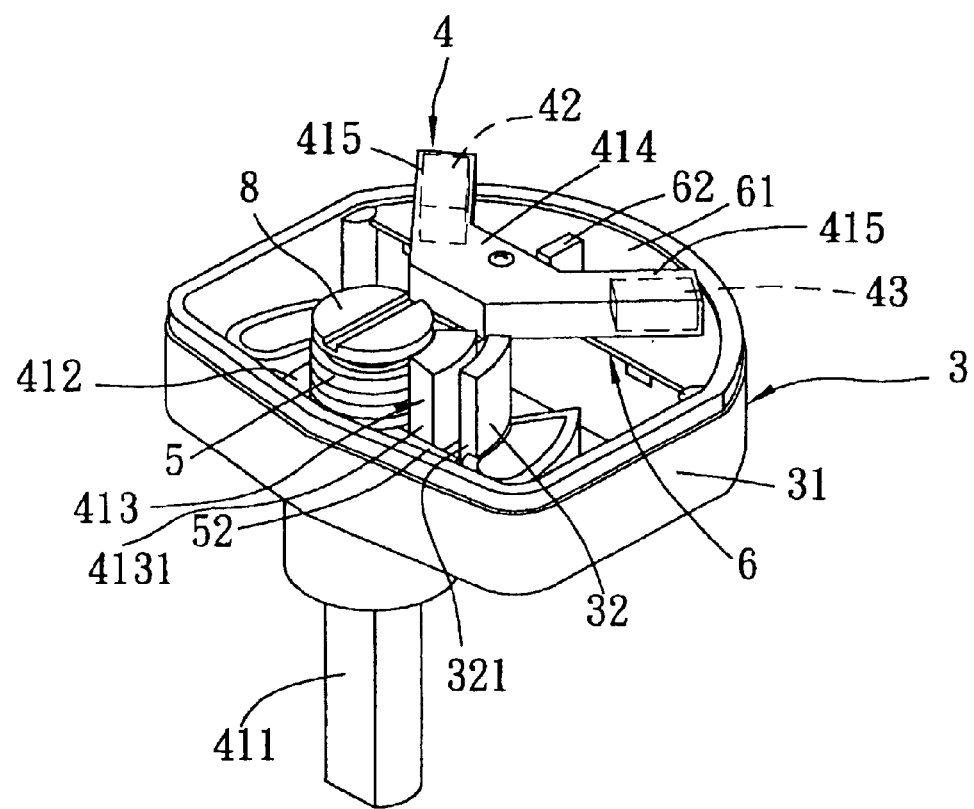
FIG. 4 is an assembled perspective view of the preferred embodiment, with a top cover of a casing removed.
Figure 5:
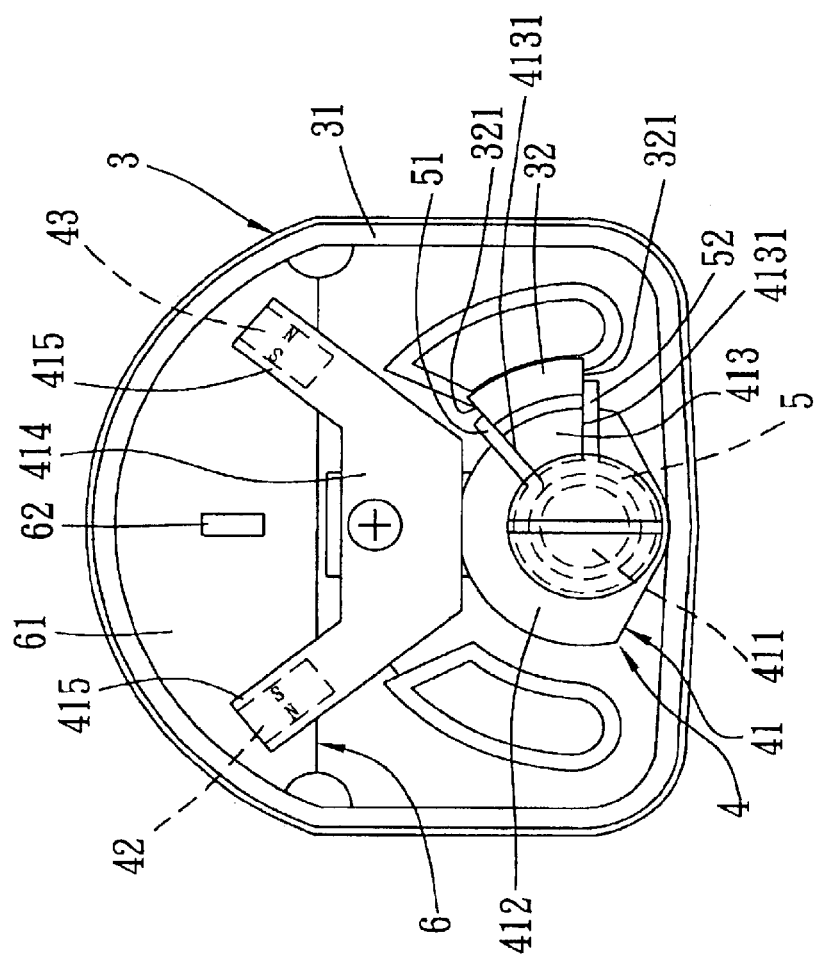
FIG. 5 is a top view of FIG. 4, illustrating a pivot axle of the control device at an initial position.

Referring to FIGS. 3, 4 and 5, the preferred embodiment of a direction and speed control device according to the present invention is to be mounted on a handle (not shown) of a motor vehicle and is to be coupled to a control rod (not shown). Since the structural relationship between the control device of this invention and the handle and the control rod of the motor vehicle are the same as those of the conventional control device described beforehand, a detailed description of the same will be dispensed with herein for the sake of brevity.

The preferred embodiment of a direction and speed control device according to this invention comprises a casing 3, a sensing unit 6, a magnet assembly 4, and a torsion spring 5.

The casing 3 is adapted to be mounted fixedly on the motor vehicle, and includes a case body 31 and a top cover 33 for closing a top open side of the case body 31.

The sensing unit 6 is mounted in the casing 3, and includes a circuit board 61 having electronic components (not shown) mounted on a lower side thereof, and a magnetic sensor 62 mounted on an upper side of the circuit board 61. The magnetic sensor 62 generates a voltage output corresponding to the direction and strength of a magnetic field sensed thereby.

The magnet assembly 4 includes a pivot axle 41 and first and second magnets 42, 43. The pivot axle 41 is mounted rotatably on the casing 3, and has a magnet carrying portion 412 extending into the casing 3, and a driven portion 411 extending from the magnet carrying portion 412 and disposed outwardly of the casing 3 for coupling with the control rod (not shown) of the motor vehicle. The pivot axle 41 is rotatable relative to the casing 3 about a pivot axis (A). The casing 3 is formed with a curved abutment member 32 that is spaced apart from the pivot axis (A) and that is formed with a pair of opposing first abutment surfaces 321. The magnet carrying portion 412 of the pivot axle 41 is formed with a curved actuating member 413 that is disposed between the pivot axis 41 and the abutment member 32 and that is formed with a pair of opposing second abutment surfaces 4131. The magnet carrying portion 412 of the pivot axle 41 has a support seat 414 mounted thereon. The support seat 414 has a pair of hollow magnet mounting portions 415, each of which has a respective one of the first and second magnets 42, 43 mounted therein such that the first and second magnets 42, 43 are disposed on opposite sides of the magnetic sensor 62. In this embodiment, each of the first and second magnets 42, 43 has an S-pole facing the magnetic sensor 62. The driven portion 411 of the pivot axle 41 is operable externally of the casing 3 via the control rod (not shown) for driving rotation of the pivot axle 41 relative to the casing 3 so as to move one of the first and second magnets 42, 43 toward the magnetic sensor 62 and so as to move the other one of the first and second magnets 42, 43 away from the magnetic sensor 62. The sensing unit 6 is adapted to generate a control output for controlling movement of the motor vehicle in one of an advancing direction and a reversing direction and for controlling moving speed of the motor vehicle in said one of the advancing and reversing directions in accordance with displacement of the first and second magnets 42, 43 relative to the magnetic sensor 62.

Figure 7:
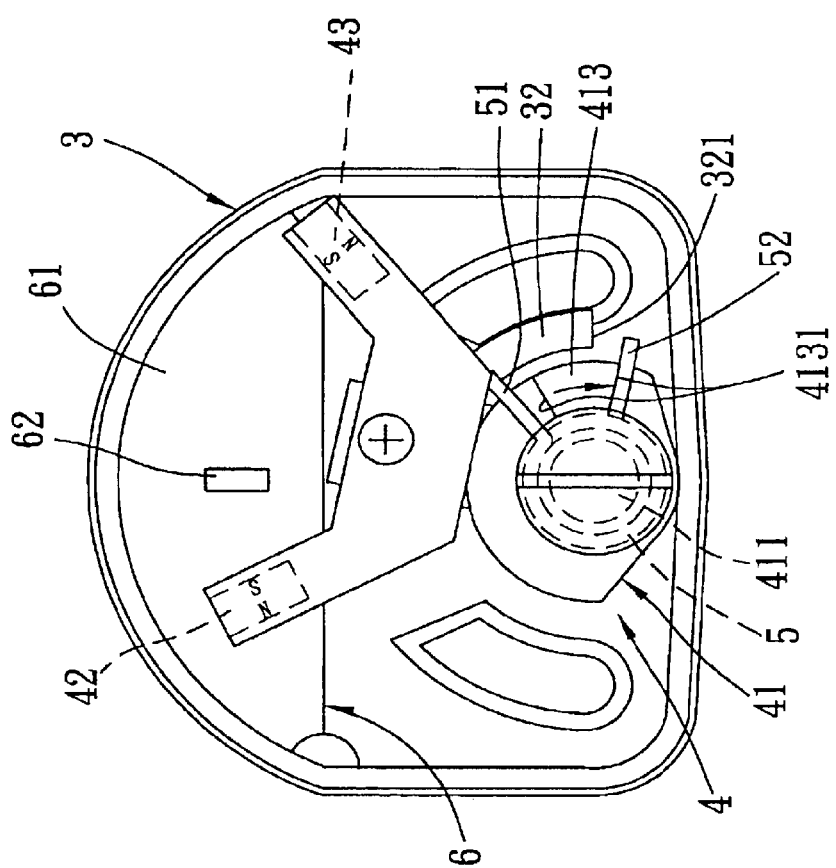
FIG. 7 is a view similar to FIG. 5, but illustrating the pivot axle when rotated in a clockwise direction.
Figure 8:
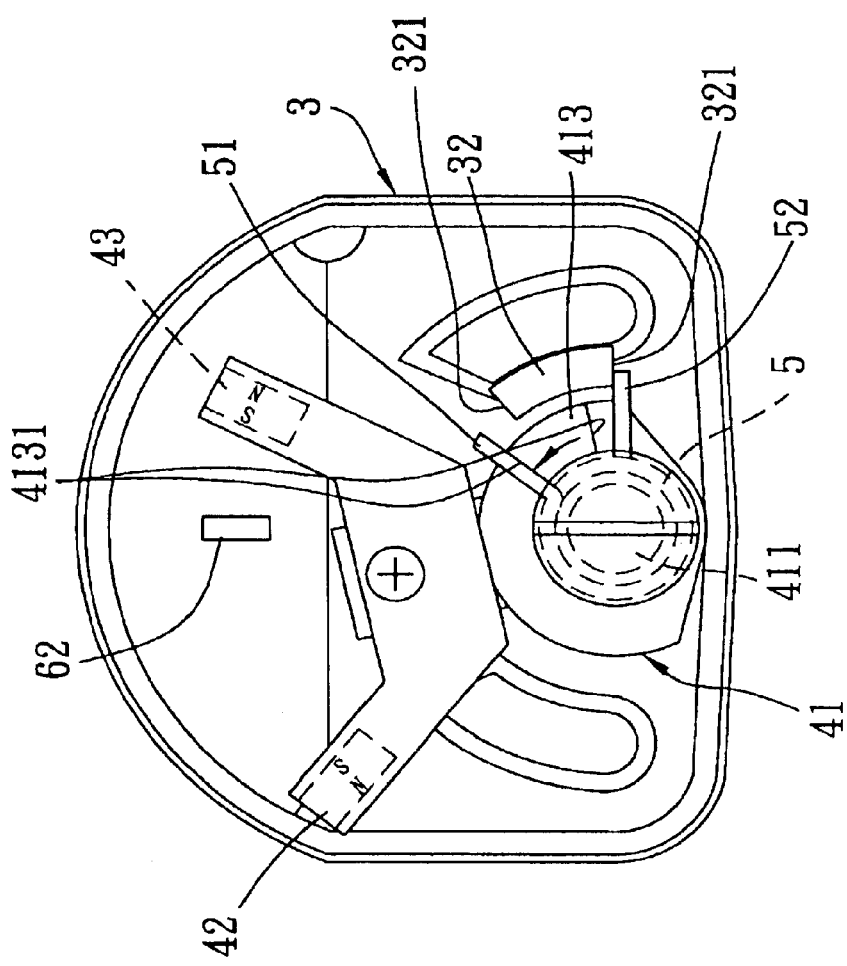
FIG. 8 is a view similar to FIG. 5, but illustrating the pivot axle when rotated in a counterclockwise direction.

The torsion spring 5 provides a restoring force to the magnet assembly 4 so as to restore the magnet assembly 4 to an initial position where the magnetic sensor 62 is disposed midway with respect to the first and second magnets 42, 43, as best shown in FIG. 5. In this embodiment, the torsion spring 5 is sleeved on the magnet carrying portion 412 of the pivot axle 41, and has a pair of spring legs 51, 52, each of which abuts against one of the first abutment surfaces 321 and one of the second abutment surfaces 4131 when the magnet assembly 4 is disposed at the initial position. In addition, a screw fastener 8 is provided to engage threadedly the magnet carrying portion 412 of the pivot axle 41, thereby retaining the torsion spring 5 on the pivot axle 41. Thus, as best shown in FIGS. 7 and 8, when the pivot axle 41 rotates clockwise or counterclockwise (in this embodiment, the maximum angle allowed in either direction from the initial position is 25°), one of the spring legs 51, 52 will be pushed by one of the second abutment surfaces 4131 away from a corresponding one of the first abutment surfaces 312 such that the torsion spring 5 accumulates a restoring force for restoring the magnet assembly 4 to the initial position (see FIG. 5).

Figure 6:
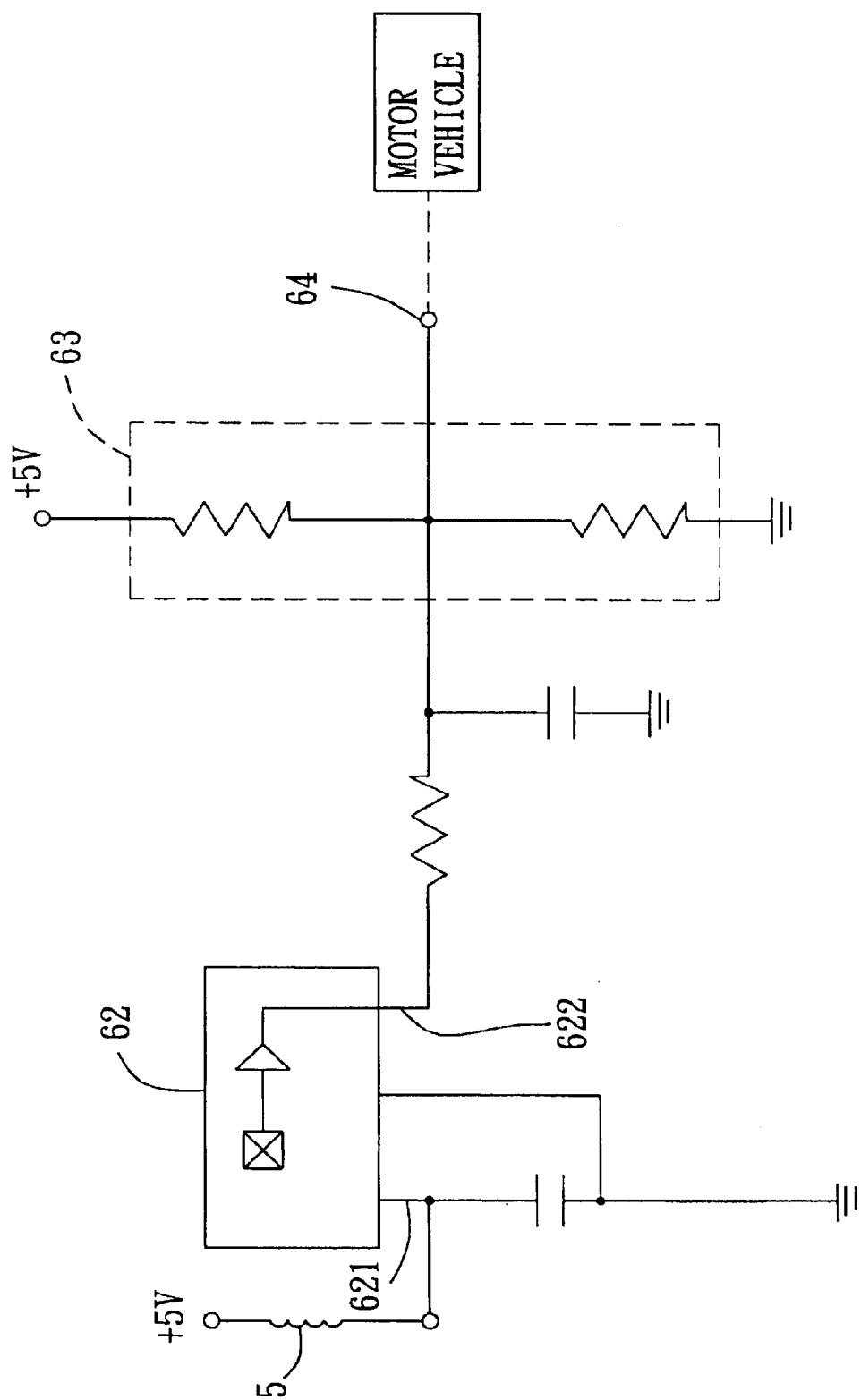
FIG. 6 is a schematic electrical circuit diagram to illustrate a sensing unit of the preferred embodiment.

In the preferred embodiment, the torsion spring 5 is made of an electrically conductive material, and is adapted to connect electrically the sensing unit 6 to an electrical power source, as best shown in FIG. 6. Particularly, each of the spring legs 51, 52 of the torsion spring 5 is connected electrically in series to a respective one of the sensing unit 6 and the electrical power source, such as by means of a length of a corresponding conductive wire (not shown) so as not to hinder rotation of the pivot axle 41 about the pivot axis (A). In this embodiment, the magnetic sensor 62 is a conventional Hall effect sensor, where a power terminal 621 thereof obtains +5 V electric power through the torsion spring 5. The voltage output of the magnetic sensor 62 is obtained by a voltage divider 63 of the sensing unit 6 from an output terminal 622 of the magnetic sensor 62. The control output of the sensing unit 6 is obtained from a junction 64 of the voltage divider 63, and is provided to the motor vehicle for controlling the moving direction and speed of the motor vehicle. Therefore, when either of the spring legs 51, 52 breaks, the +5 V electric power can no longer be supplied to the power terminal 621 of the magnetic sensor 62. As a result, the voltage output of the magnetic sensor 62 is maintained to correspond to zero velocity, and the control output at the junction 64 of the voltage divider 63 of the sensing unit 6 is set to a voltage, such as 2.5 volts, corresponding to the initial position of the pivot axle 41.

In this embodiment, when the pivot axle 41 pivots within the angular range of +250 relative to the initial position, the voltage output of the magnetic sensor 62 varies within the range of 0.7 volt to 4.3 volts. In design, the voltage range of 0.7 volt to 1.5 volts corresponds to reversing movement of the motor vehicle, whereas the voltage range of 3.5 volts to 4.3 volts corresponds to advancing movement of the motor vehicle. The motor vehicle is controlled to be immobile (i.e., the pivot axle 41 is deemed to be at the initial position) when the voltage output of the magnetic sensor 62 is outside the aforesaid two voltage ranges. The speed of the motor vehicle is proportional to the angular rotation of the pivot axle 41 from the initial position.

Since the operating principle of the direction and speed control device of this invention is based on magnet sensing techniques, the control device of this invention is more reliable as compared to the aforementioned conventional control device based on the potentiometer design. Moreover, since the torsion spring 5 in the control device of this invention has an additional function of connecting electrically the sensing unit 6 to an electrical power source, generation of an unintended control output due to inability to restore the pivot axle 41 to the initial position when one of the spring legs 51, 52 of the torsion spring 5 breaks can be avoided for improved safety.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A direction and speed control device for a motor vehicle, comprising:
   a casing adapted to be mounted fixedly on the motor vehicle;
   a sensing unit mounted in said casing and including a magnetic sensor; and
   a magnet assembly including
      a pivot axle mounted rotatably on said casing and having a magnet carrying portion extending into said casing, and a driven portion extending from said magnet carrying portion and disposed outwardly of said casing, and
      first and second magnets mounted on said magnet carrying portion of said pivot axle and disposed on opposite sides of said magnetic sensor;
   said driven portion of said pivot axle being operable externally of said casing for driving rotation of said pivot axle relative to said casing so as to move one of said first and second magnets toward said magnetic sensor and so as to move the other one of said first and second magnets away from said magnetic sensor;
   said sensing unit being adapted to generate a control output for controlling movement of the motor vehicle in one of an advancing direction and a reversing direction and for controlling moving speed of the motor vehicle in said one of the advancing and reversing directions in accordance with displacement of said first and second magnets relative to said magnetic sensor.

2. The direction and speed control device as claimed in claim 1, further comprising a torsion spring for providing a restoring force to said magnet assembly so as to restore said magnet assembly to an initial position where said magnetic sensor is disposed midway with respect to said first and second magnets.

3. The direction and speed control device as claimed in claim 2, wherein said torsion spring is made of an electrically conductive material and is adapted to connect electrically said sensing unit to an electrical power source.

4. The direction and speed control device as claimed in claim 2, wherein:
   said pivot axle is rotatable relative to said casing about a pivot axis;
   said casing being formed with an abutment member that is spaced apart from the pivot axis and that is formed with a pair of opposing first abutment surfaces;
   said magnet carrying portion of said pivot axle being formed with an actuating member that is disposed between the pivot axis and said abutment member and that is formed with a pair of opposing second abutment surfaces;
   said torsion spring being sleeved on said magnet carrying portion of said pivot axle and having a pair of spring legs, each of which abuts against one of said first abutment surfaces and one of said second abutment surfaces when said magnet assembly is disposed at the initial position.

5. The direction and speed control device as claimed in claim 4, wherein said torsion spring is made of an electrically conductive material, one of said spring legs being connected electrically to said sensing unit, the other of said spring legs being adapted to be connected electrically to an electrical power source.

6. The direction and speed control device as claimed in claim 1, wherein said magnet carrying portion of said pivot axle has a support seat mounted thereon, said support seat having a pair of magnet mounting portions, each of which has a respective one of said first and second magnets mounted thereto.

7. The direction and speed control device as claimed in claim 6, wherein each of said magnet mounting portions is a hollow portion that receives the respective one of said first and second magnets therein.

* * * * *